United States Patent
Wang et al.

(10) Patent No.: US 9,015,468 B2
(45) Date of Patent: Apr. 21, 2015

(54) SYSTEM AND METHOD FOR SIGNALING SEGMENT ENCRYPTION AND KEY DERIVATION FOR ADAPTIVE STREAMING

(71) Applicant: Futurewei Technologies, Inc., Plano, TX (US)

(72) Inventors: Xin Wang, Rancho Palos Verdes, CA (US); Yongliang Liu, Beijing (CN); Shaobo Zhang, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 66 days.

(21) Appl. No.: 13/871,524

(22) Filed: Apr. 26, 2013

(65) Prior Publication Data

US 2013/0290697 A1 Oct. 31, 2013

Related U.S. Application Data

(60) Provisional application No. 61/638,963, filed on Apr. 26, 2012.

(51) Int. Cl.
*H04L 29/06* (2006.01)
*H04N 21/2343* (2011.01)
*H04N 21/2347* (2011.01)
*H04N 21/2662* (2011.01)
*H04N 21/61* (2011.01)
(Continued)

(52) U.S. Cl.
CPC ...... *H04L 63/0428* (2013.01); *H04N 21/23439* (2013.01); *H04N 21/23476* (2013.01); *H04N 21/2662* (2013.01); *H04N 21/6125* (2013.01); *H04N 21/6334* (2013.01); *H04N 21/8456* (2013.01)

(58) Field of Classification Search
USPC .......................................................... 713/150
See application file for complete search history.

(56) References Cited

U.S. PATENT DOCUMENTS

| 7,350,082 | B2 * | 3/2008 | Candelore et al. ............. 713/191 |
| 7,684,568 | B2 * | 3/2010 | Yonge et al. ................... 380/262 |
| 8,325,918 | B2 * | 12/2012 | Tada et al. ...................... 380/217 |

(Continued)

OTHER PUBLICATIONS

Dworkin, M., "Recommendation for Block Cipher Modes of Operation: Methods and Techniques," NIST Special Publication 800-38A, 2001 Edition, Dec. 2001, 66 pages.

(Continued)

*Primary Examiner* — Amare F Tabor
(74) *Attorney, Agent, or Firm* — Conley Rose, P.C.; Grant Rodolph; Brandt D. Howell

(57) ABSTRACT

An apparatus for decoding a media stream, wherein the apparatus comprises a memory module, a processor module coupled to the memory module, wherein the memory module contains instructions that when executed by the processor cause the apparatus to perform the following: receive a media stream comprising a segment signaling information and a plurality of segments, wherein the plurality of segments comprises encoded and unencoded segments, wherein the segment signaling information comprises identification of at least two segment groups each comprising at least one segment, identify at least one segment group using the segment signaling information in the media stream, identify at least one segment decoding algorithm for the at least one segment group, identify at least one decoding key for the at least segment group, and decode each encoded segment within the at least segment group using the at least segment decoding algorithm and the at least one decoding key.

20 Claims, 5 Drawing Sheets

(51) Int. Cl.
*H04N 21/6334* (2011.01)
*H04N 21/845* (2011.01)

(56) References Cited

U.S. PATENT DOCUMENTS

| | | | | |
|---|---|---|---|---|
| 8,325,919 B2* | 12/2012 | Tada et al. | ............... | 380/217 |
| 8,688,978 B2* | 4/2014 | Struik | ............... | 713/160 |
| 2002/0090086 A1* | 7/2002 | Van Rijnsoever | ............... | 380/207 |
| 2006/0184790 A1* | 8/2006 | Oliveira et al. | ............... | 713/160 |
| 2012/0246462 A1* | 9/2012 | Moroney et al. | ............... | 713/151 |

OTHER PUBLICATIONS

Imamura, T., et al., "XML Encryption Syntax and Processing," W3C Recommendation, Dec. 10, 2002, 33 pages.

Piron, L., et al., "Segment Encryption for DASH Segments," ISO/IEC JTC1/SC29/WG11, MPEG2012/N12526, International Organisation for Standardisation, San Jose, USA, Feb. 2012, 5 pages.

Wang, X., et al., "Content Protection and DRM in DASH," ISO/IEC JTC1/SC29/WG11, MPEG2010/M18483, International Organisation for Standardisation, Guangzhou, China, Oct. 2010, 6 pages.

Wang, X., et al., "A Proposal for DASH Segment Protection and Encryption Signalling," International Organisation for Standardisation, Organisation Internationale De Normalisation, ISO/IEC JTC1/SC29/WG11, Coding of Moving Pictures and Audio, ISO/IEC JTC1/SC29/WG11, MPEG2012/m24769, XP030053112, Geneva, Switzerland, Apr. 27, 2012, 6 pages.

Wang, X., et al., "On Key Derivation and Transport for DASH Segment Encryption," International Organisation for Standardisation, Organisation Internationale De Normalisation, ISO/IEC JTC1/SC29/WG11, Coding of Moving Pictures and Audio, ISO/IEC JTC1/SC29/WG11, MPEG2012/m24967, XP030053310, Geneva, Switzerland, Apr. 27, 2012, 7 pages.

"Information Technology—Dynamic Adaptive Streaming Over HTTP (DASH)—Part 4: Segment Encryption and Authentication," ISO/IEC JTC 1/SC 29 N, ISO/IEC CD 23009-4, ISO/IEC JTC 1/SC 29/WG 11, XP030019163, May 12, 2012, 22 pages.

"Information Technology—Dynamic Adaptive Streaming over HTTP (DASH)—Part 1: Media Presentation Description and Segment Formats," ISO/IEC JTC 1/SC 29, ISO/IEC 23009-1:2012(E), ISO/IEC JTC 1/SC 29/WG 11, XP030018824, Jan. 5, 2012, 133 pages.

Foreign Communication From a Counterpart Application, PCT Application PCT/US2013/038434, International Search Report dated Aug. 7, 2013, 5 pages.

Foreign Communication From a Counterpart Application, PCT Application PCT/US2013/038434, Written Opinion dated Aug. 7, 2013, 10 pages.

* cited by examiner

SYSTEM AND METHOD FOR SIGNALING SEGMENT ENCRYPTION AND KEY DERIVATION FOR ADAPTIVE STREAMING

CROSS-REFERENCE TO RELATED APPLICATIONS

This application claims priority to U.S. Provisional Application No. 61/638,963, filed Apr. 26, 2012 by Xin Wang, et al., titled "System and Method for Signaling Segment Encryption and Key Derivation for Adaptive Streaming," which is incorporated herein by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A media content provider or distributor may deliver various media contents to subscribers or users using different encryption and/or coding schemes suited for different devices, e.g., televisions, notebook computers, and mobile handsets. The media content provider may support a plurality of media encoder and/or decoders (codecs), media players, video frame rates, spatial resolutions, bit-rates, video formats, or combinations thereof. A piece of media content may be converted from a source or original representation to various other representations to suit the different user devices.

A piece of media content may comprise a media presentation description (MPD) and a plurality of segments. An MPD may comprise elements and attributes programmed to describe information regarding the media content. In Extensible Markup Language (XML) programming, an element may comprise three parts, including a start tag indicated by <element name>, an element content, and an end tag indicated by </element name>. Further, an element may contain one or more attributes and/or child elements. An attribute may comprise an attribute name and an attribute value. The MPD may be an XML file or document describing the media content, such as its various representations (defined below), uniform resource locators (URLs) addresses, and other characteristics. For example, the media content may comprise several media components (e.g. audio, video, and text), each of which may have different characteristics that are specified in the MPD. Each media component comprises a plurality of segments containing the parts of actual media content, and the segments may be stored collectively in a single file or individually in multiple files. Each segment may contain a predefined byte size (e.g., 1,000 bytes) or an interval of playback time (e.g., 2 or 5 seconds) of the media content. A segment may comprise the minimal individually addressable unit of data; the entity that can be downloaded using URLs advertised via the MPD.

Depending on the application, the media content may be divided into various hierarchies. For example, the media content may comprise multiple periods where a period is a time interval relatively longer than a segment. For instance, a television program may be divided into several 5-minute-long program periods, which are separated by several 2-minute-long commercial periods. Further, a period may comprise one or multiple adaptation sets (ASs). An AS may provide information about one or multiple media components and its/their various encoded representations. A representation may be defined as a single encoded version of the complete asset, or of a subset of its components, e.g., International Organization for Standardization (ISO) base media file format (ISO-BMFF) containing unmultiplexed 2.5 megabit per second (Mbps) 720 pixel (p) Advanced Video Coding (AVC) video, and separate ISO-BMFF representations for 96 kilobit per second (Kbps) Moving Picture Experts Group-4 (MPEG-4) Advanced Audio Coding (AAC) audio in different languages. For instance, an AS may contain different bit-rates of a video component of the media content, while another AS may contain different bit-rates of an audio component of the same media content. A representation may be an encoded alternative of a media component, varying from other representations by bit-rate, resolution, number of channels, or other characteristics, or combinations thereof. Each representation comprises multiple segments, which are media content chunks in a temporal sequence. Moreover, sub-segments may be used to enable downloading a segment in multiple parts, each sub-segment having a specific duration and/or byte size. One skilled in the art will understand the various hierarchies that can be used to deliver a media content.

In adaptive streaming, when delivering media content to a user device, the user device may select appropriate segments dynamically based on a variety of factors, such as network conditions, device capability, and user choice. Adaptive streaming may include various technologies or standards implemented or being developed, such as Dynamic Adaptive Streaming over Hypertext Transfer Protocol (HTTP) (DASH), HTTP Live Streaming (HLS), or Internet Information Services (IIS) Smooth Streaming. For example, the user device may select a segment with the highest quality (e.g., resolution or bit-rate) possible that can be downloaded in time for playback without causing stalling or rebuffering events in the playback. Thus, the user device may seamlessly adapt its media content playback to changing network conditions. To prevent tampering, attacks, and/or unauthorized access to media content, segments of the media content may need to be protected via authentication schemes, herein referred to as encryption or encoding schemes.

In adaptive streaming techniques such as Moving Picture Experts Group (MPEG)-DASH standard, segments may be encrypted or encoded as part of an authentication scheme, e.g., to accommodate a pay-per-view video stream model. One example is the segment authentication scheme specified in a draft standard numbered ISO/IEC 23009-4 and entitled "Dynamic Adaptive Streaming over HTTP (DASH)—Part 4: Segment Encryption and Authentication" (ISO/IEC 23009-4), incorporated herein by reference, where IEC stands for International Electrotechnical Commission (IEC). Encoding the entire MPEG stream may produce larger streams than necessary, require comparatively more processing power, and/or introduce lag, and as a result some protocols only encode some segments. Conventional approaches have used alternation schemes to selectively encode segments, e.g., encoding even segments and leaving odd segments unencoded. While encoding less than the full stream, this approach may nevertheless encode more segments than necessary. Conventional approaches have further relied on a single algorithm approach for stream encoding, which may not allow content from different sources to be merged into a single MPEG stream, e.g., entertainment content from a first source and commercials from a second source. Conventional approaches have further included initialization vectors with the stream un-encoding or decrypting information, not accommodating the late binding of initialization vectors.

SUMMARY

In one embodiment, the disclosure includes an apparatus for decoding a media stream, wherein the apparatus comprises a memory module, a processor module coupled to the memory module, wherein the memory module contains instructions that when executed by the processor cause the apparatus to perform the following: receive a media stream comprising segment signaling information and a plurality of segments, wherein the plurality of segments comprises encoded and unencoded segments, wherein the segment signaling information comprises identification of at least two segment groups each comprising at least one segment, identify at least one segment group using the segment signaling information in the media stream, identify at least one segment decoding algorithm for the at least one segment group, identify at least one decoding key for the at least segment group, and decode each encoded segment within the at least segment group using the at least segment decoding algorithm and the at least one decoding key.

In another embodiment, the disclosure includes an apparatus for sending an encoded media stream, wherein the apparatus comprises a memory module, a processor module coupled to the memory module, wherein the memory module contains instructions that when executed by the processor cause the apparatus to send a media stream comprising a plurality of encoded and unencoded segments, and segment signaling information comprising information sufficient to identify at least two segment groups each comprising at least one segment, at least one segment decoding algorithm, and at least one decoding key, and at least one initialization vector, wherein encoded segments of each of the at least two segment groups can be decoded using the at least one decoding algorithm, the at least one decoding key, and the at least one initialization vector.

In another embodiment, the disclosure includes a method for decoding a media stream comprising receiving a media stream comprising a plurality of encoded and unencoded segments, wherein the media stream further comprises segment signaling information sufficient to identify a plurality of at least two segment groups each comprising at least one segment, wherein no segment group comprises both encoded and unencoded segments, identify at least one segment decoding algorithm, identify at least one decoding key for the encoded segments, and decode the encoded segments, identifying at least one segment group comprising encoded segments, identifying at least one segment decoding algorithm, identifying at least one decoding key, and decoding the at least one segment group comprising encoded segments using the at least one segment decoding algorithm and the at least one decoding key.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
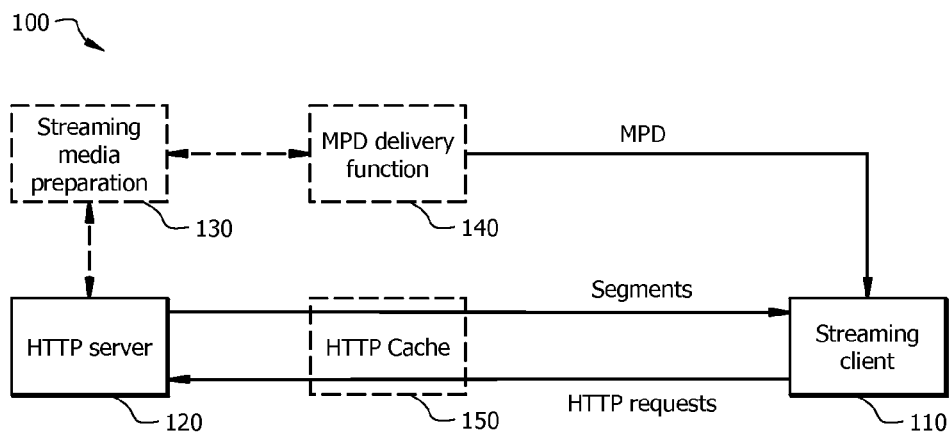
FIG. 1 illustrates an embodiment of a media streaming scheme.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are systems and methods for flexible signaling mechanisms for content protection in adaptive streaming environments, e.g., MPEG-DASH streams. For example, the disclosure includes a novel approach to accommodate the late binding of initialization vectors. Also, the disclosure includes a novel approach for informing a streaming client of encrypted/encoded or unencrypted/unencoded segments in the media stream. Further, the disclosure also includes an approach to utilize multiple encryption/encoding algorithms per media stream. This disclosure further includes systems and methods for signaling which segments are encrypted (and encoded in general) in a flexible, efficient, and compact manner in the context of MPEG-DASH standard development.

Conventional segment encryption protection schemes may specify standard encryption and key mapping methods that may be used when protection of whole segments is needed. Such schemes may operate by treating a segment as a collection of bits and applying encryption to the entire segment. Definitions may be provided to identify ranges of encrypted segments, and to specify related key(s) and initialization vectors needed within DASH MPDs. For example, ISO/IEC CD 23009-4 Sec. 5.1.2.2 provides the following table of semantics:

TABLE 1

| Element or Attribute Name | Use | Description |
| --- | --- | --- |
| CryptoPeriod |  | Specifies information and URLs needed for derivation of key information. |
| @startsegment | O | Specifies the number of the first Media Segment to which the key/Initialization Vector (IV) information applies. If not specified, derivation rules specified in 6.4.2 apply. |
| @endSegment | O | Specifies the number of the last Media Segment to which the key/IV information applies. If not specified, derivation rules specified in 6.4.2 apply. |

TABLE 1-continued

| Element or Attribute Name | Use | Description |
| --- | --- | --- |
| @IV | O | Specifies the initialization vector. It shall not be present if @ivURL is present.<br>IV derivation rules are specified in 6.4.4. |
| @keyURL | O | Specifies the URL for key derivation. For key format definition see 6.4.3. @keyURL shall not be present if @keyURLTemplate is present in the ContentProtection element.<br>Key derivation rules are specified in 6.4.3. |
| @ivURL | O | Specifies the URL for initialization vector derivation. @ivURL shall be present only if @IV is not present, and shall not be present if @ivURLTemplate is present in the ContentProtection element.<br>IV derivation rules are specified in 6.4.4. |

Legend:
For attributes: M = Mandatory, O = Optional, OD = Optional with Default Value, CM = Conditionally Mandatory.
For elements: <minOccurs> . . . <maxOccurs> (N = unbounded)

Unless otherwise defined, the terms used herein may be defined using the semantics and definitions of ISO/IEC CD 23009-4.

In conventional schemes such as that specified above, encryption is signaled by both @startSegment and @endSegment (or their implicit values). An initialization vector, if any, is conveyed as the attribute @IV. The media segment(s) encryption/decryption key information is provided as the attribute @keyURL of CryptoPeriod element, or via @keyURLTemplate attribute. To get the content key, a HTTPS protocol needs to be launched for each CryptoPeriod.

Such conventional schemes may carry out encryption on "ranges" or "chunks" of consecutive segments using the same initialization vector (IV)/Key pair across all encrypted segments. To alternate encrypted segments, e.g., encrypting only odd-numbered segments in a representation, multiple CryptoPeriod elements may be needed, increasing MPD size and start-up time. Conveying IV and keyURL elements in the MPD may further increase the MPD size. Specifying the use of "hard-coded" segment encryption formats, e.g., Marlin File Format, Secure Real Time Protocol, etc., in standards may render the conventional schemes inflexible and unable to support encryption formats using different key lengths or other modes.

The present disclosure introduces elements which may be used to expand the MPD and provide flexibility and signaling mechanisms for content protection in adaptive streaming environments, e.g., MPEG-DASH streams. Example semantics (explained further below) expressing the systems and methods introduced include those described in the following table:

TABLE 2

| Attribute Name | Use | Description |
| --- | --- | --- |
| @segmentEncryptionFlag | O | Specifies the signaling of the segments in the applicable CryptoPeriod to which the key/IV information applies. The value may be interpreted as a binary string encoded in the base-64 binary format. The 0-1 value of the i-th bit in this string signals if the key/IV information applies to the i-th segment in the CryptoPeriod, with 0 for not applicable and 1 for applicable. If not specified, the key/IV information applies to all the Media Segments in this CryptoPeriod. If the total number of bits in the binary conversion of this value, e.g., a hexadecimal number, is larger than the total number of segments covered in the CryptoPeriod, then the extra bits in this string may be ignored. On the other hand, if the total number of bits is smaller than the total number of segments, the key/IV information may apply to all the extra segments (not signaled by the bits) by default. |
| @segmentEncryptionSignaling | 1 | Specifies a text string that represents a sequence of signed decimal integers, e.g., separated by a separator (e.g. a comma ",") between two signed decimal integers, in order to signal encrypted segments and unencrypted segments. A positive decimal integer, e.g. 3, in this sequence may indicate that a segment group contains 3 segments and all 3 segments are encrypted by a same IV/key pair. A negative decimal integer, e.g. −4, may indicate that the current group contains 4 segments and all 4 segments are unencrypted. |
| @iterates | O | Specifies a number of iterates of using the segment encryption signaling, e.g., as specified in @segmentEncryptionSignaling. If not present, the default number may be '1'. |

TABLE 2-continued

| Attribute Name | Use | Description |
| --- | --- | --- |
| @algorithm | O | Specifies an encryption algorithm, which may include name, key length, and encryption mode, for all segments associated with this attribute; examples include "aes128-ctr" and "aes128-cbc". When not present, the default may be "aes128-cbc". |
| @ivURL | O | Specifies the URL for IV derivation. Shall overwrite @ivURLTemplate if the latter is present in the ContentProtection element. |
| @ivURLTemplate | O | Specifies the template for IV URL generation, using same syntax and variable substitution as defined in ISO/IEC 23009-1 sec. 5.3.9.4.4. For a run of segments using the same ivURL, the segment number inserted may be the number of the first segment number of the associated CryptoPeriod. Notably, the use of @ivURLTemplate may not imply use of SegmentTemplate or @keyURLTemplate. |
| @keyLicenseURL | O | Specifies the license URL for key derivation. May overwrite @keyLicenseURLTemplate if the latter is present in the ContentProtection element. Notably, this attribute may be used in conjunction with a ContentProtection element that indicates a particular DRM system/scheme. |
| @keyLicenseURLTemplate | O | Specifies the template for license URL generation for key transport, e.g., using same syntax and variable substitution as defined in ISO/IEC 23009-1 sec. 5.3.9.4.4. For a run of segments using the same keyURL, the segment number inserted may be the number of the first segment number of the associated CryptoPeriod. May not be present when @keyURLTemplate is present. Notably, the use of @keyLicenseURLTemplate may not imply use of other templates such as SegmentTemplate and @ivURLTemplate. Further, this attribute may be used in conjunction with a ContentProtection element that indicates a particular DRM system/scheme. |

Turning first to the @segmentEncryptionFlag and @segmentEncryptionSignaling attributes, the @segmentEncryptionFlag attribute may be introduced to the CryptoPeriod element or any element that needs to signal segment encryption, e.g., the ContentProtection element in DASH MPD. The @segmentEncryptionFlag value may represent a binary string, e.g., as encoded in the base64 format, hexadecimal format, etc. The 0-1 value of the i-th bit in this string signals whether the i-th segment in the CryptoPeriod is encoded or encrypted, e.g., using 0 for unencoded or unencrypted and 1 for encoded or encrypted. For example, a value of AAAA (hexadecimal)=1010 1010 1010 1010 (binary) may provide a segment map indicating that odd-numbered segments 1, 3, 5, 7, 9, 11, 13, 15 are encrypted and the even-numbered segments, 2, 4, 6, 8, 10, 12, 14 are not, and a value of 5EB52 (hexadecimal)=0101 1110 1011 0101 0010 (binary) may indicate that segments 2, 4, 5, 6, 7, 9, 11, 12, 14, 16, 19 are encrypted and the others in segments 1 to 20 are not.

The @segmentEncryptionSignaling attribute performs a similar function to the @segmentEncryptionFlag in a different way. The @segmentEncryptionSignaling attribute may create a segment mapping of encrypted segments using positive and negative integers as a string of text to group encrypted and/or unencrypted segments, and provide additional information. For example, if the value of @segmentEncryptionSignaling is "3, −4, 3, 1", it means that there are eleven segments, the segments are divided into four groups of adjacent segments, the numbers of adjacent segments contained in the four groups are 3, −4, 3, 1 respectively, all segments in the second group are unencrypted, all segments in remaining groups are encrypted, and segments in these four groups are temporally ordered according to the order of their corresponding integers.

If the total number of bits in the binary conversion of a @segmentEncryptionFlag number or segments set forth in a @segmentEncryptionSignaling is larger than the total number of segments covered in the CryptoPeriod, then the extra bits in the string may be ignored. If the total number of bits in the binary conversion of the @segmentEncryptionFlag number is smaller than the total number of segments (e.g., when the period is open ended), the extra segments (not signaled by the bits) may all be encrypted by default. Notably, that the maximum number of segments whose encryption can be signaled by a hexadecimal number of n digits may be 4 times n. This means that if there are 100 encrypted or encoded segments in a CryptoPeriod, a hexadecimal number of 25 digits may be sufficient for signaling if they are encrypted.

The @iterates value may be a positive number indicating the number of iterations of the @segmentEncryptionFlag and/or @segmentEncryptionSignaling attributes are required to decode the applicable segments. If not present, the default may be only a single iteration. Thus, if needed, the segment map expressed in a more compact form for a large number of segments, e.g., with @segmentEncryptionFlag=1101 (binary) and @iterates=1000 (base ten).

The @algorithm attribute may indicate the algorithm used to encode or encrypt the segments associated with the attribute. This may help accommodate encoding a single stream using multiple algorithms.

The @ivURL and @ivURLTemplate attributes are introduced to support the late binding of IVs. The implementation of the @ivURL and @ivURLTemplate attributes may be similar to the implementation of the late binding of keys using the @keyURLTemplate and @keyURL attributes contained in the conventional approach.

The @keyLicenseURL and @keyLicenseURLTemplate elements are introduced to support key transport in the form of a license. These attributes may specify the location and format for contacting a license server to acquire rights objects in a manner similar to that currently utilized in digital right management (DRM) paradigms.

Those of skill in the art will recognize that it is not necessary to have multiple CryptoPeriod elements for multiple groups of segments. Only one ContentProtection element with 3 attributes, e.g., @segmentEncryptionSignaling, @ivURLTemplate, and @keyURLTemplate, is sufficient to provide the whole necessary segment encryption information for a Representation or an AdaptationSet.

FIG. 1 illustrates an embodiment of a media streaming scheme 100, which may be implemented to deliver media content from an HTTP server 120 to a streaming client 110. For example, the streaming scheme 100 may be a DASH or other type of streaming scheme. The streaming client 110 may be a stand-alone device, a program or application implemented in an operating system of a user device, or a web client accessed in a web platform. The media content stored in the HTTP server 120 may be generated or prepared by a streaming media preparation unit 130. The media preparation unit 130 may be co-located with the HTTP server 120 or elsewhere (e.g., in at a content provider site). The HTTP server 120 may be part of a content provider network or may be a node in a content distribution network (CDN). The media content may be generated at least in part by one or more content providers and then transmitted to a CDN node. The media content in the HTTP server 120 may comprise a MPD and a plurality of segments. Note that, if desired, the MPD and the segments may be stored in different servers and retrieved by the streaming client 110 from different servers. In addition, a HTTP server described herein merely serves as an example of server, it should be understood that thus embodiments disclosed herein may also be implemented in any other suitable type of server.

In the streaming scheme 100, the streaming client 110 may send a request to the HTTP server 120 for media content. In response, the HTTP server 120 may first use a MPD delivery function 140 to deliver a MPD to the streaming client 110. The MPD may be delivered using HTTP, HTTP secure (HTTPS), email, Universal Serial Bus (USB) drive, broadcast, or any other transport. By parsing the MPD, the streaming client 110 may learn information regarding the media content, such as the timing of the program, the availability of media content, the media types, resolutions, minimum and maximum bandwidths, the existence of various encoded alternatives of multimedia components, the accessibility features and the required DRM, the location of each media component on the network, and other characteristics of the media content and delivery environment. Using this information, the streaming client 110 may select the appropriate encoded representation or combination of representations and start streaming of the media content by fetching segments using HTTP Get requests. The HTTP server 120 may use a segment delivery function to deliver the segments to the streaming client 110. Note that the streaming client 110 may download segments from a plurality of HTTP servers, e.g., to maximize usage of network bandwidth. The streaming client 110 may render the downloaded media appropriately so as to provide streaming service to a user of the streaming client 110. Although the streaming client 110 may obtain the segments based from locations specified by URLs contained in the MPD, the segment may alternately be stored in a HTTP cache 150 (e.g., in the HTTP server 120 or a CDN node) to improve the efficiency of streaming client 110's receipt.

If buffering is desired, after appropriate buffering to allow for network throughput variations, the streaming client 110 may continue to download subsequent segments while monitoring bandwidth fluctuations of the network. Depending on its measurements, the streaming client 110 may adaptively adjust streaming to the available bandwidth by downloading segments of different representations (e.g., with a lower or higher bit-rate) to maintain an adequate buffer.

Figure 2:
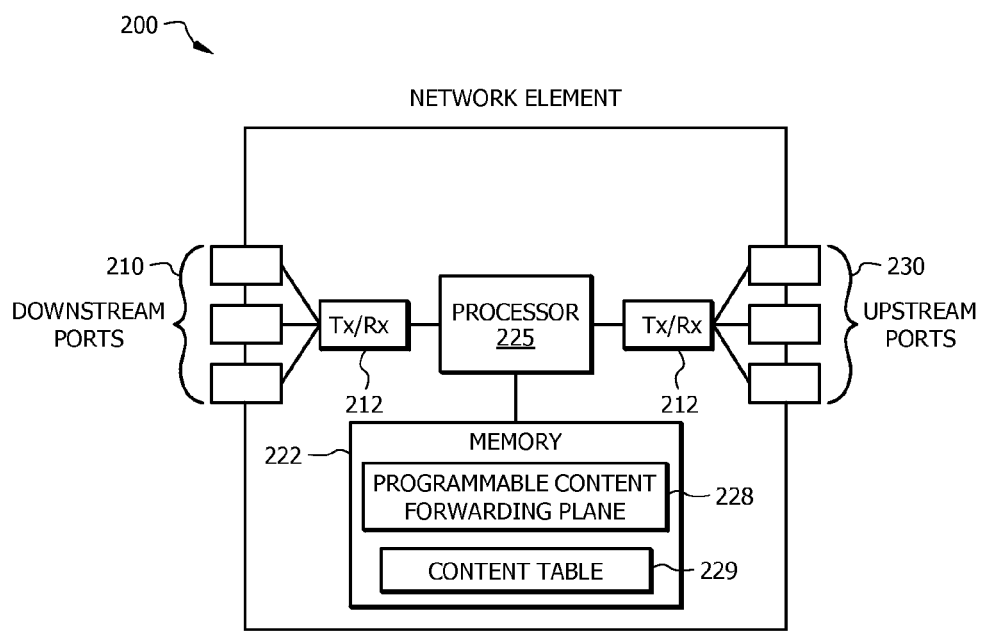
FIG. 2 is a schematic diagram of an embodiment of a network element.

At least some of the features/methods described in the disclosure may be implemented in a network element. For instance, the features/methods of the disclosure may be implemented using hardware, firmware, and /or software installed to run on hardware. The network element may be any device that transports data through a network, e.g., a switch, router, bridge, server, client, etc. FIG. 2 is a schematic diagram of an embodiment of a network element 200, which may be any device that transports and processes data through a network. For instance, the network element 200 may be a content router or any apparatus or router in a content centric network (CCN)/named data network (NDN) implanting one of the schemes described herein. The network element 200 may be configured to implement or support the adaptive forwarding strategies described above.

The network element 200 may comprise one or more downstream ports 210 coupled to a transceiver (Tx/Rx) 212, which may be transmitters, receivers, or combinations thereof. The Tx/Rx 212 may transmit and/or receive frames from other nodes via the downstream ports 210. Similarly, the network element 200 may comprise another Tx/Rx 212 coupled to plurality of upstream ports 230, wherein the Tx/Rx 212 may transmit and/or receive frames from other nodes via the upstream ports 230. A processor 225 may be coupled to the Tx/Rxs 212 and be configured to process the frames and/or determine which nodes to send the frames. The processor 225 may comprise one or more multi-core processors and/or memory modules 222, which may function as data stores, buffers, etc. Processor 225 may be implemented as a general processor or may be part of one or more application specific integrated circuits (ASICs) and/or digital signal processors (DSPs). The downstream ports 210 and/or upstream ports 230 may contain electrical and/or optical transmitting and/or receiving components. Network element 200 may or may not be a routing component that makes routing decisions. The memory modules 222 may be used to house the instructions for carrying out the system and methods described herein, e.g., as streaming client 110, as an HTTP server 120, etc. The memory module 222 may comprise a programmable content forwarding plane block 228 that may be implemented on the processor 225. Alternately, the forwarding plane block 228 may be implemented directly on the processor 225. The programmable content forwarding plane block 228 may be configured to implement content forwarding and processing functions, such as at an application layer or layer 3 (L3) in the Open Systems Interconnection (OSI) model, where the content may be forwarded based on content name or prefix and possibly other content related information that maps the content to network traffic. Such mapping information may be maintained in a content table 229 at the memory module 222. The programmable content forwarding plane block 228 may interpret user requests for content and accordingly fetch content, e.g., based on metadata and/or content name, from the network or other content routers and may store the content, e.g., temporarily, in the memory module 222. The programmable content forwarding plane block 228 may then forward the cached content to the user. The programmable content forwarding plane block 228 may be implemented using software, hardware, or both and may operate above the Internet Protocol (IP) layer, e.g., linking layer 2 (L2) or linking layer 3 (L3), in the OSI model. The memory module 222 may comprise a cache for temporarily storing content, e.g., a Random Access Memory (RAM). Additionally, the memory module 222 may comprise a long-term storage for storing content relatively longer, e.g., a Read Only Memory (ROM). For instance, the cache and the long-term storage may include dynamic random-access memories (DRAMs), solid-state drives (SSDs), hard disks, or combinations thereof.

It is understood that by programming and/or loading executable instructions onto the network element 200, at least one of the processor 220, the cache, and the long-term storage are changed, transforming the network element 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 3:
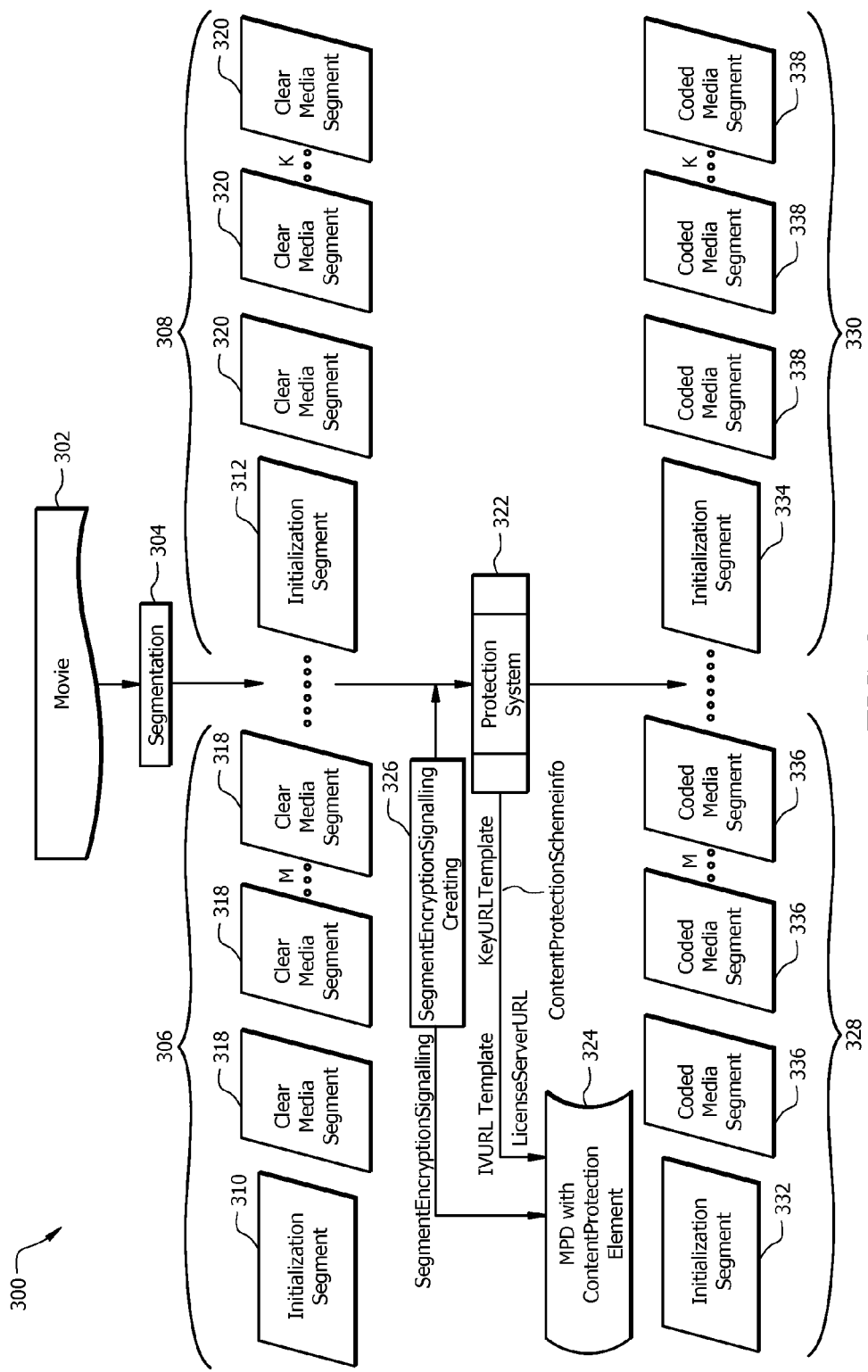
FIG. 3 is a schematic diagram illustrating an embodiment of a scheme for generating segments and content protection encoding.

FIG. 3 is a diagram illustrating an embodiment of a scheme 300 for generating segments and content protection encoding. The scheme 300 may be implemented by an HTTP server, e.g., the HTTP server 120 of FIG. 1, or by a media content provider, e.g., in the form of network element 200 of FIG. 2. For example, the scheme 300 may be part of the forwarding plane block 228. A media content 302 may be divided by a segmentation unit or module 304 into a plurality of segments, e.g., as representations 306 and/or 308 (collectively or alternatively, 306/308). As mentioned previously, depending on the application, various hierarchies may be used to represent the media content. If sub-segments are used, schemes described herein may apply to the sub-segment just as they apply to a segment.

Each representation 306/308 may comprise a plurality of segments, e.g., an initialization segment (IS) 310 and/or 312 and at least one media segment (MS) 318 and/or 320. For example, as shown in FIG. 3, representation 306 comprises one IS 310 and m MSs 318. Similarly, representation 308 comprises one IS 312 and k MSs 320. Each representation 306/308 may comprise an equal or different number of total segments. For example, in FIG. 3 representation 306 comprises m MSs 318, while representation 308 comprises k MSs 320, where k and m can be the same or different. In addition, a segment encryption signaling module 326 may create the segment encryption signaling described herein and send the segment encryption signaling to a ContentProtection element 324 and a protection system 322.

The protection system 322 may process representations 306 and 308 to be DASH-compliant, e.g., by applying a specific content protection system. The protection system 322 may determine which MSs 318 and/or 320 require encoding and may create a suitable @segmentEncryptionSignaling to employ for segment encryption signaling/segment mapping. The protection system 322 may coordinate with a third party license server to obtain a license server URL and may coordinate with a third party IV server to obtain an ivURL. Scheme 300 may populate the MPD stream with the ContentProtection element at 324, and may create and bind a @segmentEncryptionSignaling attribute, an @ivURLTemplate attribute, a @keyURLTemplate attribute, and a @LicenseServerURL attribute. The protection system 322 may encode or encrypt the MSs 318 and/or 320 in the predetermined manner using one or more preselected algorithm(s) to create representations 328 and 330. Representations 328 and 330 may comprise ISs 332 and 334 and encoded MSs 336 and 338. If multiple or non-standard algorithms are employed, one or more @algorithm attributes may be populated and bound to the MPD stream.

In some embodiments, segment signaling information, either time-variant or time invariant, is placed into separate streams from the media. For example, this can be done by assigning a packet identifier (PID) to the stream and making it part of a program, e.g., in an MPEG-2 Transport Stream. Alternately, the information may be placed into an index segment which remains unencrypted or unencoded. Yet another option is to place the information into an MPD file. In this third case, any time-invariant portions may be placed into those MPD elements or attributes that are not repeatedly associated with individual segments.

Figure 4:
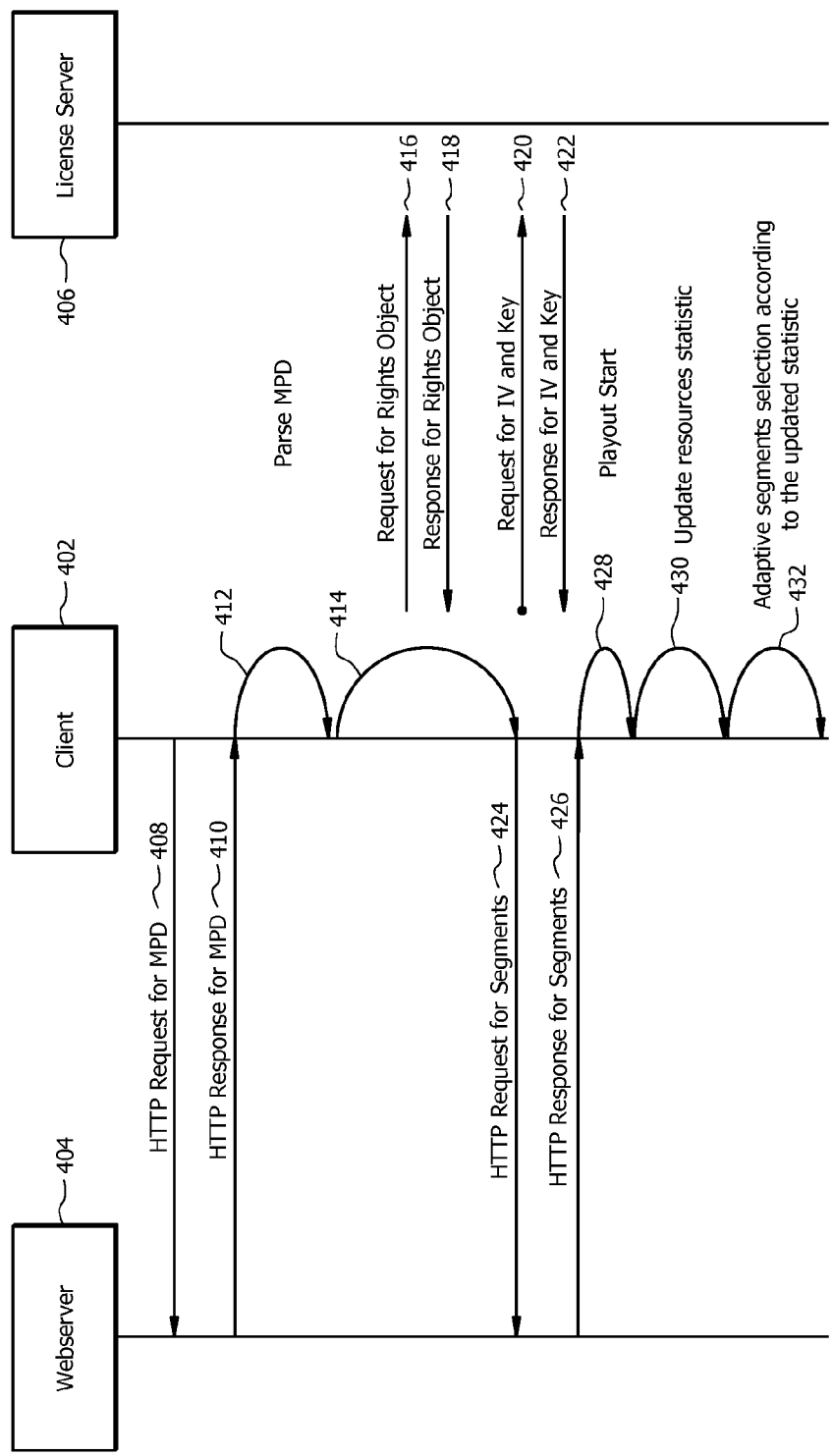
FIG. 4 is a protocol diagram for transmitting data under the embodiment described in FIG. 3.

FIG. 4 is a protocol diagram for transmitting data under the embodiment described in FIG. 3. FIG. 4 comprises a DASH client 402 configured to support the content protection scheme 300, e.g., client 110 of FIG. 1, a webserver 404 configured to execute scheme 300, e.g., HTTP server 120 of FIG. 1, and a license server 406, e.g., a network element 200 of FIG. 2. The client 402 may make an HTTP request for MPD to webserver 404 at 408. At 410, webserver 404 may send an HTTP response for MPD to client 402, e.g., including ISs 332 and 334 of FIG. 3. The client 402 may make the appropriate decoding selection and/or configuration according to the resource statistics, network environment or conditions, device capability, user selections, etc. At 412, client 402 may parse the MPD to interpret information contained in the MPD, and at 414 the client 402 may implement a rights object process 414. Specifically, at 416 the client 402 may request a rights object from license server 406 using the @keyLicenseURL URL, and at 418, license server 406 may respond to client 402 with the requested license and/or rights object. At 420, client 402 may request an IV from license server 406 using the @ivURL URL. At 422, license server 406 may respond to client 402 with the requested IV data. Using the @keyLicenseURLTemplate and @ivURLTemplate data, client 402 may obtain the IV/key pair necessary to decode the relevant segment(s). Although the license and the IV are transmitted from the same license server 406, one skilled in the art will recognize that, in alternative embodiments, a licenses and IVs may be stored in different servers and transmitted from different servers. At 424, client 402 may send an HTTP request for segments to webserver 404. At 426, webserver 404 may send an HTTP response for segments to client 402 containing coded media segments, e.g., MSs 336 and/or 338 of FIG. 3. Although the MPD and the segments are transmitted from the same web server 404, one skilled in the art will recognize that, in alternative embodiments, a MPD describing a media content and segments of the media content may be stored in different servers and transmitted from different servers. For example, the MPD may be transmitted from a content distributor, while the segments may be transmitted from a third-party content delivery node (CDN). The client 402 may decrypt the encrypted media by applying the appropriate algorithm decryption IV/key pair according to the @segmentEncryptionSignaling information. At 428, client 402 may commence a playout start sequence to provide the media stream to a user (not depicted) of client 402. At 430, client 402 may update resource statistics, and at 432, client 402 may adaptively select segments according to the updated statistics. As required to maintain the data stream, client 402 may recommence one or more steps 408 to 426 until streaming is complete. Notably, the step sequencing mentioned above is merely illustrative and those of skill in the art will recognize that some steps may occur concurrently or in another order.

Figure 5:
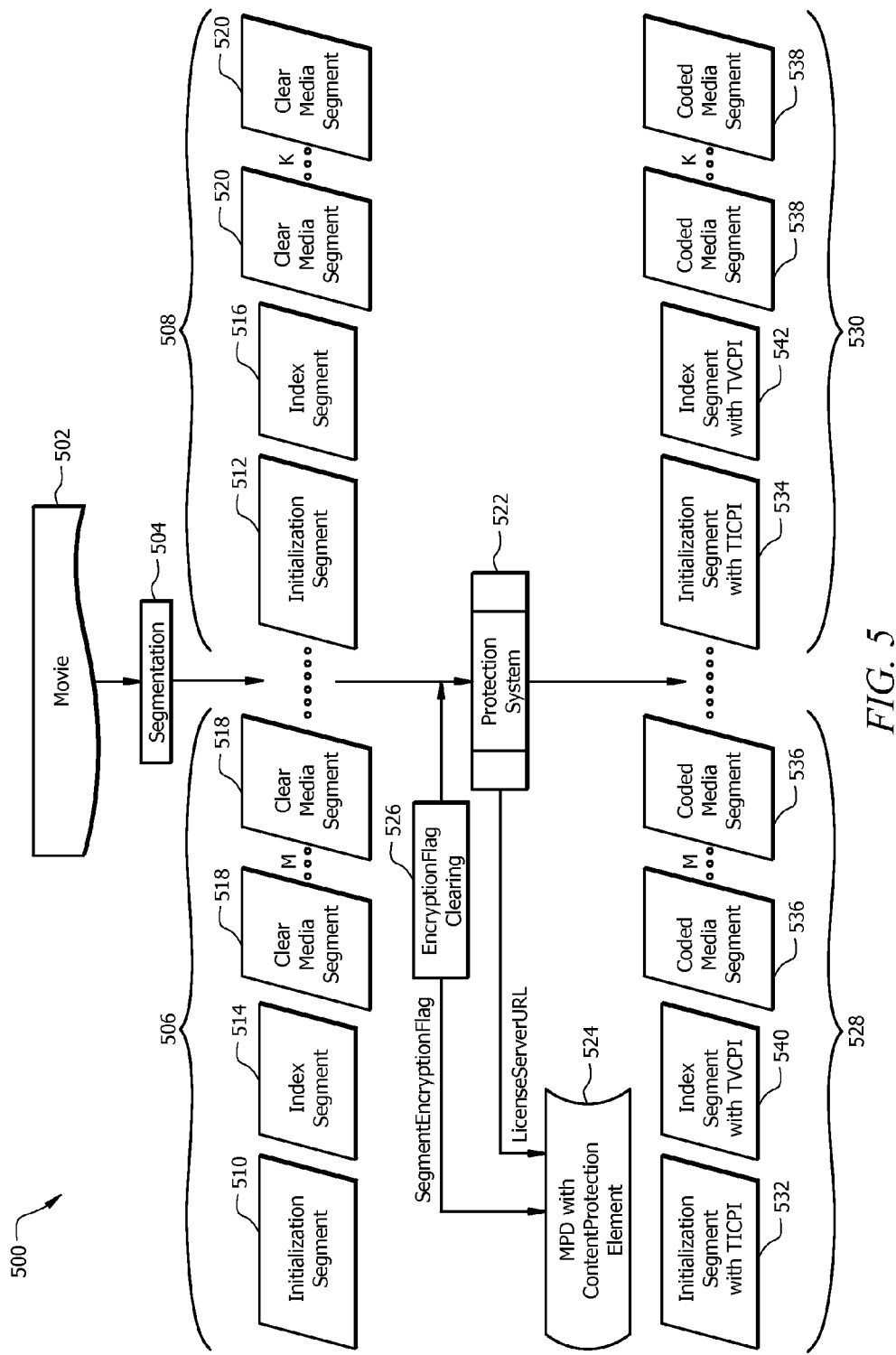
FIG. 5 is a schematic diagram illustrating an embodiment of a scheme for generating segments and content protection encoding.

FIG. 5 is a diagram illustrating an embodiment of a scheme 500 for generating segments and content protection encoding. Except as otherwise noted, the components listed in FIG. 5 may be substantially similar to the components of FIG. 3. The scheme 500 may be implemented by an HTTP server, e.g., the HTTP server 120 of FIG. 1, or by a media content provider, e.g., in the form of network element 200 of FIG. 2. For example, the scheme 500 may be part of the forwarding plane block 228 of FIG. 2. A media content 502 may be divided by a segmentation unit or module 504 into a plurality of segments, e.g., as representations 506 and/or 508 (collectively or alternatively, 506/508). As mentioned previously, depending on the application, various hierarchies may be used to represent the media content. If sub-segments are used, schemes described herein may apply to the sub-segment just as they apply to a segment.

Each representation 506/508 may comprise a plurality of segments, e.g., an IS 510 and/or 512, an index segment 514 and/or 516, and at least one MS 518 and/or 520. For example, as shown in FIG. 5, representation 506 comprises one IS 510, one index segment 514, and m MSs 518. Similarly, representation 508 comprises one IS 512, one index segment 516, and k MSs 520. Each representation 506/508 may comprise an equal or different number of total segments. For example, in FIG. 5 representation 506 comprises m MSs 518, while representation 508 comprises k MSs 520, where k and m can be the same or different.

A protection system 522 may process representations 506 and 508 to be DASH-compliant, e.g., by applying a specific content protection system. The protection system 522 may determine which MSs 518 and/or 520 require encoding and may create a suitable @segmentEncryptionFlag to employ for segment encryption signaling or segment mapping. The protection system 522 may coordinate with a third party license server to obtain a license server URL, may populate the MPD with a ContentProtection element at 524, and may create and bind a @segmentEncryptionFlag at 526. Scheme 500 may populate the MPD stream with a ContentProtection element at 324, and may create and bind a @segmentEncryptionFlag attribute, an @iv attribute, a @keyURLTemplate attribute, and a @LicenseServerURL attribute. The protection system 522 may encode or encrypt the MS s 518 and/or 520 in the predetermined manner using one or more preselected algorithm(s) to create representations 528 and 530. Representations 528 and 530 may comprise ISs 532 and 534, index segments 540 and 542, and encoded MSs 536 and 538. If multiple or non-standard algorithms are employed, one or more @algorithm attributes may be populated and bound to the MPD stream.

In some embodiments, time-invariant content protection information (TI-CPI), e.g., encryption algorithm and encryption operation mode, or time-variant content protection information (TV-CPI), e.g., encryption key and initialization vector, may be added to the stream, e.g., into the encrypted media segment-related IS 532 and/or 534 or into the Index Segments 540 and/or 542, as indicated in FIG. 5.

Figure 6:
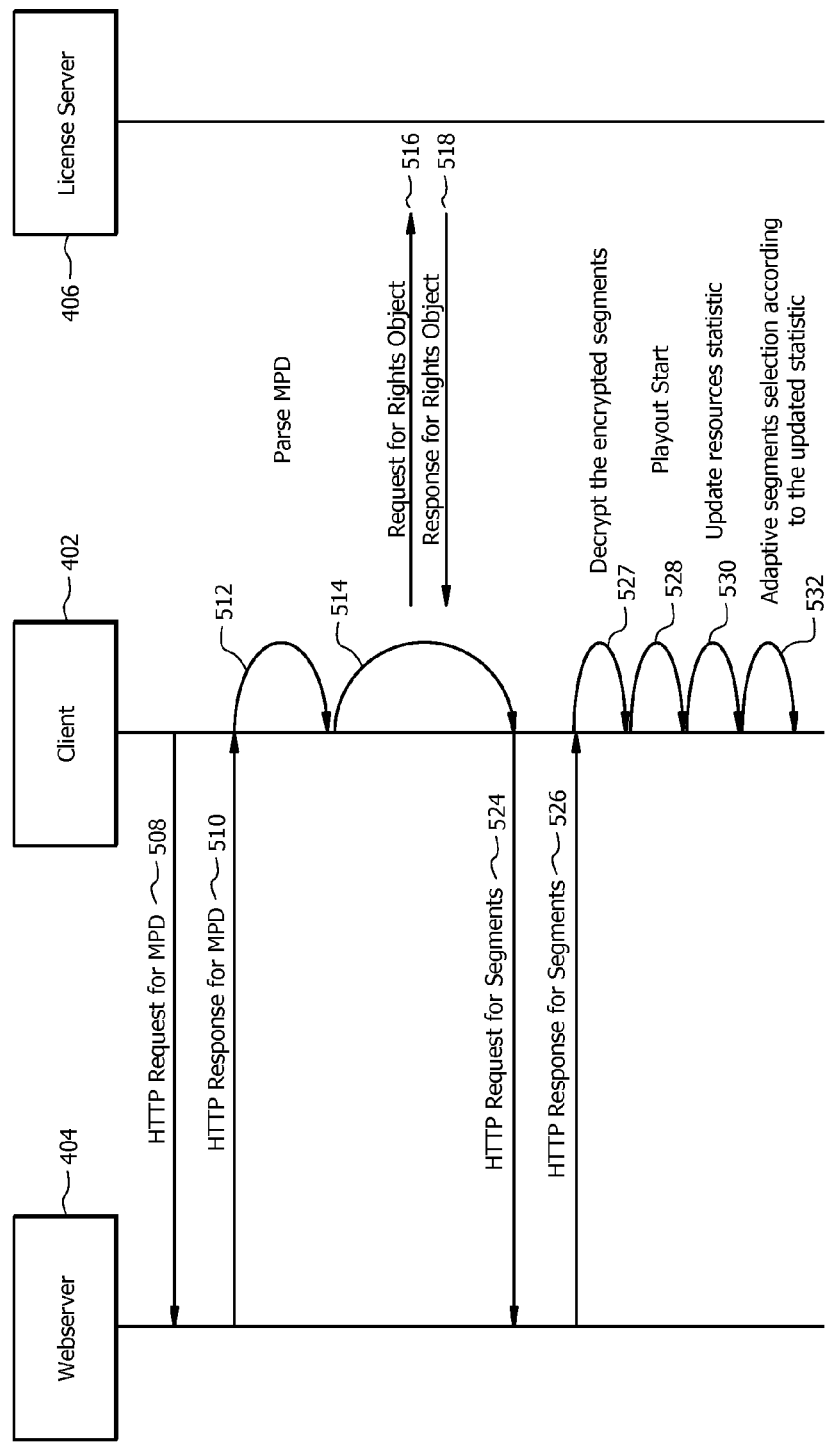
FIG. 6 is a protocol diagram for transmitting data under the embodiment described in FIG. 5.

FIG. 6 is a protocol diagram for transmitting data under the embodiment described in FIG. 5. FIG. 6 comprises a DASH client 402 configured to support the content protection scheme 500, a webserver 404 configured to execute scheme 500, and a license server 406. The client 402 may make an HTTP request for MPD to webserver 404 at 508. At 510, webserver 404 may send an HTTP response for MPD to client 402, e.g., which may include ISs 532 and 534 and index segments 540 and 542 of FIG. 5. The client 402 may make the appropriate decoding selection and/or configuration according to the resource statistics, network environment or conditions, device capability, user selections, etc. At 512, client 402 may parse the MPD to interpret information contained in the MPD, and at 514 the client 402 may implement a rights object process 514. Specifically, at 516 client 402 may request a rights object from license server 406 using the @keyLicenseURL URL, and at 518, license server 406 may respond to client 402 with the requested license and/or rights object. Using the @keyLicenseURLTemplate, client 402 may obtain the license and/or key for the IV/key pair necessary to decode the relevant segment(s). The IV and, in other embodiments, the segment encryption key, may be obtained from the index segment. At 524, client 402 may send an HTTP request for segments to webserver 404. At 526, webserver 404 may send an HTTP response for segments to client 402 containing coded media segments, e.g., MSs 536 and/or 538 of FIG. 5. Although the MPD and the segments are transmitted from the same web server 404, one skilled in the art will recognize that, in alternative embodiments, an MPD describing a media content and segments of the media content may be stored in different servers and transmitted from different servers. For example, the MPD may be transmitted from a content distributor, while the segments may be transmitted from a third-party content delivery node (CDN). The client 402 may decrypt the encrypted media by applying the appropriate algorithm decryption IV/key pair according to the @segmentEncryptionFlag information at 527. At 528, client 402 may commence a playout start sequence to provide the media stream to a user (not depicted) of client 402. At 530, client 402 may update resource statistics, and at 532, client 402 may adaptively select segments according to the updated statistics. As required to maintain the data stream, client 402 may recommence one or more steps 508 to 526 until streaming is complete. Notably, the step sequencing mentioned above is merely illustrative and those of skill in the art will recognize that some steps may occur concurrently or in another order.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, ... 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. All documents described herein are incorporated herein by reference.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus for decoding a media stream, wherein the apparatus comprises:
   a memory module;
   a processor module coupled to the memory module, wherein the memory module contains instructions that when executed by the processor cause the apparatus to perform the following:
      receive a media stream comprising a plurality of segments, wherein the plurality of segments comprises encoded and unencoded segments in a single period of the media stream;
      obtain a manifest file comprising segment signaling information that identifies a plurality of segment groups comprising an unencoded segment group and an encoded segment group in the single period of the media stream;
      identify each segment group using the segment signaling information;
      identify at least one segment decoding algorithm for at least one of the segment groups;
      identify at least one decoding key for at least one of the segment groups ; and
      decode each encoded segment within the encoded segment group using the at least one segment decoding algorithm and the at least one decoding key.

2. An apparatus for decoding a media stream, wherein the apparatus comprises:
   a memory module;
   a processor module coupled to the memory module, wherein the memory module contains instructions that when executed by the processor cause the apparatus to perform the following:
      receive a media stream comprising segment signaling information and a plurality of segments, wherein the plurality of segments comprises encoded and unencoded segments, wherein the segment signaling information comprises identification of at least two segment groups each comprising at least one segment;
      identify at least one segment group using the segment signaling information in the media stream;
      identify at least one segment decoding algorithm for the at least one segment group;
      identify at least one decoding key for the at least one segment group; and
   decode each encoded segment within the at least one segment group using the at least one segment decoding algorithm and the at least one decoding key,
   wherein the segment signaling information comprises either:
      a string of positive and negative numbers, wherein a positive number n indicates a segment group of n adjacent encoded segments, and wherein a negative number −m indicates a segment group of m unencoded segments; or
      a string of data that in binary code indicates segments that are encoded with a one and indicates segments that are not encoded with a zero.

3. The apparatus of claim 2, wherein the segment signaling information is not contained within a media stream initialization segment.

4. The apparatus of claim 1, wherein identifying each segment group comprises identifying a first segment group and a second segment group, and identifying the at least one decoding algorithm comprises identifying a first segment decoding algorithm for the first segment group and a second segment decoding algorithm for the second segment group, where the first and second segment decoding algorithms are different.

5. The apparatus of claim 1, wherein identifying each segment group comprises identifying a first segment group and a second segment group, and identifying the at least one decoding key comprises identifying a first decoding key for the first segment group and a second decoding key for the second segment group, where the first and second decoding keys are different.

6. The apparatus of claim 1, further comprising identifying at least one initialization vector for the segment groups, wherein the step of decoding further uses the at least one initialization vector.

7. The apparatus of claim 6, wherein the media stream further comprises an initialization vector Uniform Resource Locator (URL) template, and wherein the initialization vector URL template specifies the template for initialization vector generation.

8. An apparatus for sending an encoded media stream, wherein the apparatus comprises:
   a memory module;
   a processor module coupled to the memory module, wherein the memory module contains instructions that when executed by the processor cause the apparatus to:

send a media stream to a client, the media stream comprising a plurality of encoded and unencoded segments in a single period of the media stream; and send segment signaling information that:
- identifies a plurality of segment groups comprising an unencoded segment group and one or more encoded segment groups in the single period of the media stream;
- identifies at least one segment decoding algorithm associated with the encoded segment groups; and
- identifies at least one decoding key associated with the encoded segment groups; and
- identifies at least one initialization vector associated with the encoded segment groups, wherein encoded segments of each of the encoded segment groups are decodable using the at least one decoding algorithm, the at least one decoding key, and the at least one initialization vector.

9. The apparatus of claim 8, wherein the information that identifies at least one initialization vector comprises a uniform resource locator (URL).

10. The apparatus of claim 8, wherein the information that identifies at least one initialization vector further comprises an initialization vector template for initialization vector generation, and is sufficient to enable coordination with a third party to generate an initialization vector.

11. The apparatus of claim 8, wherein the information that identifies at least two segment groups is sufficient to identify at least two segment groups comprising encoded segments, wherein the information that identifies at least one decoding key is sufficient to identify at least two decoding keys for decoding the plurality of encoded segments, and wherein each decoding key is associated with one segment group comprising encoded segments.

12. The apparatus of claim 11, wherein the information that identifies the plurality of segment groups is sufficient to identify at least two encoded segment groups comprising encoded segments, wherein the information that identifies at least one segment decoding algorithm is sufficient to identify at least two segment decoding algorithms, and wherein each segment decoding algorithm is associated with one encoded segment group.

13. An apparatus for sending an encoded media stream, wherein the apparatus comprises:
a memory module;
a processor module coupled to the memory module, wherein the memory module contains instructions that when executed by the processor cause the apparatus to:
send a media stream comprising:
- a plurality of encoded and unencoded segments; and
- segment signaling information comprising information sufficient to identify:
  - at least two segment groups each comprising at least one segment;
  - at least one segment decoding algorithm; and
  - at least one decoding key; and
  - at least one initialization vector,
wherein encoded segments of each of the at least two segment groups are decodable using the at least one decoding algorithm, the at least one decoding key, and the at least one initialization vector,
wherein the information sufficient to identify at least two segment groups comprises either:
- a string of positive and negative numbers, wherein a positive number n indicates a segment group of n adjacent segments that are encoded, and wherein a negative number −m indicates a segment group of m segments that are unencoded; or
- a string of data that in binary code indicates encoded segments with a one and indicates unencoded segments with a zero.

14. The apparatus of claim 13, wherein the segment signaling information is not contained within a media stream initialization segment.

15. A method for decoding a media stream comprising:
receiving a media stream comprising a plurality of encoded and unencoded segments, wherein the media stream further comprises segment signaling information sufficient to:
- identify a plurality of at least two segment groups each comprising at least one segment, wherein no segment group comprises both encoded and unencoded segments;
- identify at least one segment decoding algorithm;
- identify at least one decoding key for the encoded segments; and
- decode the encoded segments;
identifying at least one segment group comprising encoded segments;
identifying at least one segment decoding algorithm;
identifying at least one decoding key; and
decoding the at least one segment group comprising encoded segments using the at least one segment decoding algorithm and the at least one decoding key,
wherein the segment signaling information comprises a string of positive and negative numbers,
wherein a positive number, n, indicates a segment group of n adjacent encoded segments, and
wherein a negative number, −m, indicates a segment group of m unencoded segments.

16. The method of claim 15, wherein the segment signaling information further comprises information sufficient to query a third party for an initialization vector, wherein the method further comprises:
querying the third party for the initialization vector;
receiving the initialization vector; and
binding the initialization vector,
and wherein the step of decoding the encoded segment group further comprises using the initialization vector.

17. The method of claim 16, wherein the segment signaling information further comprises an initialization vector template specifying a template for initialization vector generation.

18. The method of claim 15, wherein the media stream further comprises information sufficient to identify a second segment decoding algorithm, and wherein the method further comprises:
identifying the second segment decoding algorithm;
identifying a second segment group comprising encoded segments; and
decoding the second segment group using the second segment decoding algorithm.

19. The method of claim 15, wherein the segment signaling information is not contained within a media stream initialization segment.

20. The apparatus of claim 1, wherein the manifest file is a Media Presentation Description (MPD) file.

* * * * *